United States Patent
Asaoka

(10) Patent No.: US 8,535,186 B2
(45) Date of Patent: Sep. 17, 2013

(54) STRADDLE-TYPE VEHICLE

(75) Inventor: Ryousuke Asaoka, Shizuoka (JP)

(73) Assignee: Yamaha Hatsudoki Kabushiki Kaisha, Iwata-shi (JP)

(*) Notice: Subject to any disclaimer, the term of this patent is extended or adjusted under 35 U.S.C. 154(b) by 1555 days.

(21) Appl. No.: 11/848,072

(22) Filed: Aug. 30, 2007

(65) Prior Publication Data

US 2008/0053731 A1 Mar. 6, 2008

(30) Foreign Application Priority Data

Sep. 1, 2006 (JP) ................................. 2006-237745

(51) Int. Cl.
- F16H 59/00 (2006.01)
- F16H 61/00 (2006.01)
- F16H 63/00 (2006.01)
- G06F 7/00 (2006.01)
- G06F 17/00 (2006.01)
- G06F 19/00 (2011.01)

(52) U.S. Cl.
USPC ............................................. 474/28; 701/51

(58) Field of Classification Search
USPC ................ 474/11, 12, 18, 28, 33, 45, 46, 48, 474/69, 70, 72; 477/39, 41, 44, 45, 48, 69; 701/51, 60, 61, 62
See application file for complete search history.

(56) References Cited

U.S. PATENT DOCUMENTS

| | | | |
|---|---|---|---|
| 2,151,189 A * | 3/1939 | Coddington | 474/27 |
| 4,261,229 A | 4/1981 | Mizuno et al. | |
| 4,264,314 A * | 4/1981 | Imamura | 474/205 |
| 4,458,558 A * | 7/1984 | Frank | 74/665 GE |
| 4,509,125 A * | 4/1985 | Fattic et al. | 701/61 |
| 4,526,557 A * | 7/1985 | Tanaka et al. | 474/18 |
| 4,536,171 A * | 8/1985 | Tanaka et al. | 474/28 |
| 4,559,850 A | 12/1985 | Sakakibara | |
| 4,576,265 A * | 3/1986 | Kumura et al. | 477/95 |
| 4,579,021 A * | 4/1986 | Yamamuro et al. | 477/45 |
| 4,597,308 A * | 7/1986 | Tanaka et al. | 477/49 |
| 4,653,004 A * | 3/1987 | Osanai et al. | 701/62 |
| 4,670,843 A * | 6/1987 | Matsumura et al. | 701/61 |
| 4,710,879 A * | 12/1987 | Vahabzadeh | 701/61 |
| 4,823,267 A * | 4/1989 | Kumura | 701/62 |
| 4,836,054 A * | 6/1989 | Kumura | 477/48 |
| 4,853,857 A * | 8/1989 | Oshiage et al. | 701/60 |
| 4,853,858 A * | 8/1989 | Kumura | 701/61 |
| 5,031,481 A * | 7/1991 | Algrain et al. | 477/45 |
| 5,069,086 A * | 12/1991 | Murano et al. | 477/39 |
| 5,074,166 A * | 12/1991 | Yamashita et al. | 477/39 |
| 5,103,693 A * | 4/1992 | Hibi | 477/41 |
| 5,217,412 A * | 6/1993 | Indlekofer et al. | 474/69 |

(Continued)

FOREIGN PATENT DOCUMENTS

EP 0 111 891 A2 6/1984
EP 0 127 082 A2 12/1984

(Continued)

*Primary Examiner* — William A Rivera
*Assistant Examiner* — Henry Liu
(74) *Attorney, Agent, or Firm* — Rabin & Berdo, P.C.

(57) ABSTRACT

A continuously variable transmission configured to reduce response delay and hunting due to overshooting. The continuously variable transmission is electronically controlled by a control unit. The control unit is connected to an actuator for moving a moving flange of a primary sheave and controls the output of the actuator in such a manner as to vary between upshift and downshift of the continuously variable transmission.

18 Claims, 8 Drawing Sheets

(56) References Cited

U.S. PATENT DOCUMENTS

| | | | |
|---|---|---|---|
| 5,427,579 A * | 6/1995 | Kanehara et al. | 474/28 |
| 5,435,729 A * | 7/1995 | Hildreth et al. | 434/365 |
| 5,634,794 A * | 6/1997 | Hildreth et al. | 434/37 |
| 5,997,431 A * | 12/1999 | Vukovich et al. | 477/48 |
| 6,042,501 A * | 3/2000 | Yamamoto | 477/48 |
| 6,179,739 B1 * | 1/2001 | Tsai et al. | 474/12 |
| 6,219,608 B1 * | 4/2001 | Abo et al. | 701/51 |
| 6,243,638 B1 * | 6/2001 | Abo et al. | 701/51 |
| 6,443,871 B2 * | 9/2002 | Taniguchi et al. | 477/44 |
| 6,723,014 B2 * | 4/2004 | Shinso et al. | 474/20 |
| 2001/0046911 A1 * | 11/2001 | Taniguchi et al. | 474/18 |
| 2002/0025881 A1 | 2/2002 | Miyazaki et al. | |
| 2002/0072441 A1 * | 6/2002 | Inoue et al. | 474/18 |
| 2002/0173391 A1 * | 11/2002 | Endo et al. | 474/18 |
| 2005/0192133 A1 * | 9/2005 | Oshiumi et al. | 474/18 |
| 2006/0030452 A1 | 2/2006 | Tsukada et al. | |
| 2006/0252589 A1 * | 11/2006 | Tay | 474/83 |
| 2007/0105672 A1 * | 5/2007 | Luedtke | 474/33 |

FOREIGN PATENT DOCUMENTS

| | | |
|---|---|---|
| JP | 60-222648 | 11/1985 |
| JP | 04-210156 | 7/1992 |
| JP | 9-14416 A | 1/1997 |
| JP | 09-105456 | 4/1997 |
| JP | 2002-39358 A | 2/2002 |

* cited by examiner (a) MOVING TIME FOR UPSHIFT (b) MOVING TIME FOR DOWNSHIFT

STRADDLE-TYPE VEHICLE

RELATED APPLICATIONS

This application claims the benefit of priority under 35 USC 119 of Japanese patent application nos. 2006-237745, filed on Sep. 1, 2006, which application is hereby incorporated by reference in its entirety.

BACKGROUND OF THE INVENTION

1. Field of the Invention

The present invention relates to straddle-type vehicles, and in particular, to a straddle-type vehicle equipped with an electronically controlled belt-type continuously variable transmission.

2. Description of Related Art

Straddle-type vehicles such as motor scooters widely employ V-belt type continuously variable transmissions comprising a pair of primary and secondary sheaves with a variable groove width. The primary sheave is disposed on a primary shaft to which the output of power source such as an engine is input. The secondary sheave is disposed on a secondary shaft that extracts the output to a driving wheel. A V-belt is wound around the sheaves. The winding diameters of the V-belt around the sheaves are controlled by changing the groove widths by a groove-width adjusting mechanism so that the speed change ratio of the sheaves can be controlled steplessly.

The primary sheave and the secondary sheave are each generally composed of a fixed flange and a moving flange which have a V-groove therebetween. The moving flanges are movable along the axis of the primary shaft or the secondary shaft. The speed change ratio can be controlled steplessly by moving the moving flanges by the groove-width adjusting mechanism.

Some types of V-belt type continuously variable transmissions move the moving flange of the primary sheave for groove-width adjustment by an electric motor. This type can flexibly adjust the groove width because the moving flange can be moved in either the direction to decrease the groove width of the primary sheave (to Top) or the direction to increase the groove width (to Low) by the output (moving thrust) of the electric motor (refer to, e.g., Japanese Patent No. 3043061). The output of the electric motor is controlled by the power supplied from a control unit. The supply power is determined from the deviation of the actual position of the moving flange from a target position. Some V-belt type continuously variable transmissions control the supply power by a pulse-width modulation (PWM) signal (refer to, e.g., Japanese Patent No. 3399727).

The inventor has worked toward development of an electronic belt-type continuously variable transmission that controls speed change ratio electronically, and has found that movement of the moving flange of the primary sheave sometimes has a delayed response when vehicles are started from Low mode. The response delay at the Low start is caused by a shortage of thrust necessary for moving the moving flange, which in turn is due to a shortage of output of the electric motor. To solve the problem, the output of the electric motor must be increased sufficiently to overcome the response delay at Low start.

However, increasing the output of the electric motor at Low start causes another problem of overshooting a target moving flange position during shifting to Top or during downshift.

Referring to FIG. 8, the problem of overshooting that occurs when the output of the electric motor is increased is described. FIG. 8 is a schematic diagram of the fluctuations of the moving flange position when the output of the electric motor is controlled to Low start. Line 90 indicates a set target moving flange position, line 92 indicates an actual moving flange position, and line 94 indicates engine speed. The horizontal axis indicates time. FIG. 8 shows that when lines 90 and 92 are close to each other, the moving flange reaches the target flange position more smoothly.

Lines 90 and 92 agree with each other in Low during upshift. That is, the response delay of the moving flange at Low start is improved. However, in the region shifted to Top, a so-called overshooting phenomenon occurs in which line 92 fluctuates, that is, the moving flange overshoots the target moving flange position and returns to reach the target moving flange position. During downshift, overshooting occurs across the almost whole region, in which line 92 fluctuates significantly, lacking stability.

Such an overshooting phenomenon causes a so-called hunting phenomenon as indicated by line 94 in which fluctuation of the engine speed is repeated, resulting in significantly uncomfortable ride.

SUMMARY OF THE INVENTION

The present invention is made in consideration of these problems and provides a continuously variable transmission in which response delay and hunting due to overshooting are reduced.

One embodiment of the invention provides a belt type continuously variable transmission electronically controlled by a control unit and comprising a primary sheave and a secondary sheave each having a V-groove. A belt is wound around the V-grooves of the sheaves, and groove widths of the sheaves are varied to control a speed change ratio steplessly. The primary and secondary sheaves each have a fixed flange and a moving flange mounted on a rotation shaft. The groove width of the primary sheave is adjusted by controlling movement of its moving flange with an actuator. The moving flange of the secondary sheave is biased in a direction to narrow the groove width by a groove-width adjusting mechanism. The actuator is connected to the control unit. The control unit controls the output of the actuator in such a manner as to change the output of the actuator between upshift and downshift of the continuously variable transmission.

In one embodiment, the output of the actuator is larger for upshift than for downshift.

In another embodiment of the invention, a belt type continuously variable transmission is electronically controlled by a control unit and comprises a primary sheave and a secondary sheave each having a V-groove and a belt wound around the V-grooves of the sheaves. Groove widths of the sheaves are varied to control the speed change ratio steplessly. The primary sheave and the secondary sheave each have a fixed flange and a moving flange mounted on a rotation shaft. The groove width of the primary sheave is adjusted by controlling movement of the moving flange of the primary sheave by an actuator. The moving flange of the secondary sheave is biased in a direction to narrow the groove width. The actuator is connected to the control unit. The control unit is connected to a sheave-position sensor that senses the position of the moving flange of the primary sheave. The control unit controls the output of the actuator in such a manner as to change the output of the actuator according to the moving flange position sensed by the sheave-position sensor.

In one embodiment, the output of the actuator is larger in Low than in Top.

In one embodiment, a storage unit connected to the control unit stores specified relative moduli corresponding to moving flange positions of the primary sheave. The output of the actuator is controlled according to an actuator manipulation amount calculated by multiplying a command value to the actuator by a relative modulus.

In one embodiment, the actuator is an electric motor; and the output of the electric motor is controlled by electric power supplied to the electric motor.

In one embodiment, the electric power supplied to the electric motor is controlled by a duty ratio of a pulse signal output from the control unit.

A straddle-type vehicle according to the invention comprises a continuously variable transmission as described above.

According to the invention, the control unit connected to the actuator for moving the moving flange of the primary sheave controls the output of the actuator so as to change between upshift and downshift of the continuously variable transmission. This allows the output of the actuator to be controlled to an appropriate magnitude, thereby enabling the moving flange to be moved by appropriate power. Response delay and hunting due to overshooting is thereby prevented.

According to the invention, the control unit may also control the output of the actuator as to vary according to the moving flange position sensed by the sheave position sensor. This allows the output of the actuator to be controlled to an appropriate magnitude, thereby enabling the moving flange to be moved by appropriate power. Response delay and hunting due to overshooting is thereby prevented.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
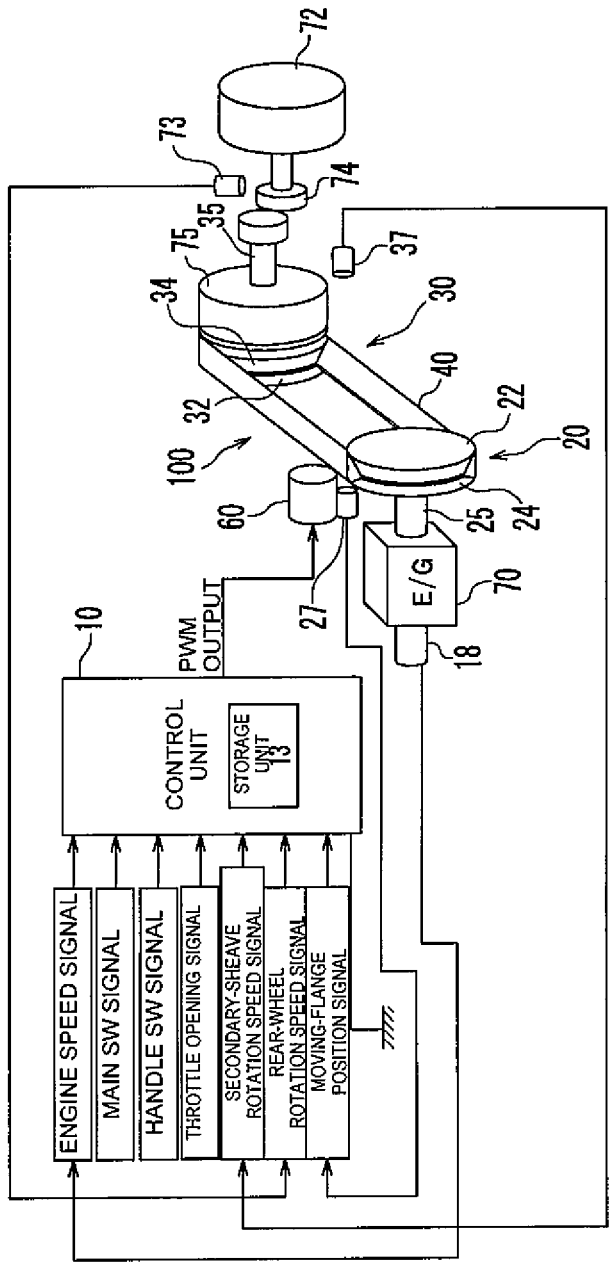
FIG. 1 is a block diagram of a continuously variable transmission according to an embodiment of the invention.

The inventor has worked toward development of electronic belt-type continuously variable transmissions, and has found that movement of the moving flange of the primary sheave sometimes has a delayed response or that overshooting occurs. One of the causes of such response delay and overshooting may be an excess or a deficiency of the output of an electric motor for moving the moving flange. However, the cause of the excess or deficiency of the output of the electric motor has been unknown.

Accordingly, the inventor has tried to find the cause of the excess or deficiency of the output of the electric motor, and has found a mechanism capable of reducing the response delay and overshooting and reached the invention.

Embodiments of the invention are described with reference to the drawings, wherein like reference numerals designate like or corresponding components throughout. The invention is not limited to the following embodiments.

Referring initially to FIG. 1, a continuously variable transmission 100 according to an embodiment of the invention is described. FIG. 1 is a block diagram of continuously variable transmission 100.

Continuously variable transmission 100 of this embodiment is electronically controlled by a control unit 10. A belt 40 is wound around V-grooves of a primary sheave 20 and a secondary sheave 30. A speed change ratio is controlled steplessly by changing the groove widths of the sheaves.

Primary sheave 20 and secondary sheave 30 comprise fixed flanges 22 and 32 and moving flanges 24 and 34 attached to rotation shafts 25 and 35, respectively. Moving flanges 24 and 34 are movable along rotation shafts 25 and 35, respectively. The fixed flanges are also referred to as fixed sheaves, and the moving flanges are also referred to as moving sheaves.

Moving flange 34 of secondary sheave 30 is biased by a groove-width adjusting mechanism in a direction to decrease groove width. The groove-width adjusting mechanism of this embodiment has a spring (not shown) attached to moving flange 34 and a torque com (not shown) provided at part of moving flange 34.

The groove width of primary sheave 20 is adjusted by controlling the movement of moving flange 24 with an actuator 60 (by sliding moving flange 24 along rotation shaft 25). Moving flange 24 can be moved by the output of electric motor 60 either in a direction to narrow the groove width of primary sheave 20 (to Top) or in a direction to extend the groove width (to Low), allowing flexible adjustment of the groove width.

Actuator 60 of this embodiment is an electric motor. The output of electric motor 60 is controlled by the electric power supplied to electric motor 60. In other words, electric motor 60 converts the electric energy of the input power to mechanical energy, and outputs it to move moving flange 24.

The power to be supplied to electric motor 60 is controlled using a pulse width modulation (PWM) technique. In this PWM technique, the output of electric motor 60 is controlled by varying the time proportion of the ON/OFF (duty ratio) of electric motor 60 while the voltage of the supply power is fixed.

While in this embodiment the output of electric motor 60 is controlled by the PWM technique, it may not necessarily be controlled by the PWM technique but also be controlled with the voltage of supply power varied in an analog manner. Examples of actuator 60 are, in addition to the electric motor, a stepping motor, a linear motor, a solenoid, a hydraulic system, and a pneumatic system.

Actuator 60 for adjusting the groove width of primary sheave 20 is electrically connected to control unit (transmission control unit) 10. Control unit 10 is an electronic control unit (ECU). The electronic control unit (ECU) is, e.g., a microprocessing unit (MPU).

Control unit 10 is configured to control the output of actuator 60 such that it is changed between upshift and downshift.

Specifically, the output of actuator 60 is controlled according to differences in sheave slide resistance during upshift and downshift. "Sheave slide resistance" denotes load resistance applied when moving flange 24 of primary sheave 20 is moved.

The difference in sheave slide resistance during upshift and downshift is now described. The inventor tracked the cause of the excess or deficiency of the output of actuator 60, and has found that the sheave slide resistance has an influence on the movement of moving flange 24. As shown in the measurements of moving time of moving flange 24 in FIGS. 2(a) and (b), there is a significant difference in the moving time of moving flange 24 during upshift and downshift. Both the output of actuator 60 and the stroke of moving flange 24 at the measurement are fixed.

FIG. 2(a) shows measurements for upshift, and FIG. 2(b) shows measurements for downshift, wherein the vertical axis indicates moving time in seconds, and the horizontal axis indicates engine speed in revolutions per minute (rpm). Here, the longer the moving time of moving flange 24, the lower the moving speed of moving flange 24 becomes, at the same engine speed, which indicates that the sheave slide resistance is high.

As can be seen from the comparison between FIG. 2(a) and FIG. 2(b), the moving time is generally shorter during downshift than during upshift. Therefore, sheave slide resistance at downshift is considerably lower than that at upshift. In other words, sheave slide resistance at upshift is higher than that at downshift.

Control unit 10 of this embodiment controls the output of actuator 60 according to the difference in sheave slide resistance, as shown in FIGS. 2(a) and 2(b), that is, the respective sheave slide resistances. More specifically, in the example of FIGS. 2(a) and (b), since the sheave slide resistance is higher at upshift than at downshift, the output of actuator 60 is controlled by control unit 10 so as to be higher for upshift than for downshift.

With continuously variable transmission 100 of this embodiment, control unit 10 controls the output of actuator 60 to change between upshift and downshift. In other words, the output of actuator 60 is controlled according to sheave slide resistance at upshift and at downshift. The output of actuator 60 is thus controlled to an appropriate magnitude, which enables moving flange 24 of primary sheave 20 to be moved with appropriate power, thereby reducing response delay and hunting due to overshooting.

Continuously variable transmissions typically control actuator output according to deviation of an actual moving flange position from a target moving flange position (the stroke of moving flange 24). Accordingly, at the same stroke of moving flange 24, the output of actuator 60 is constant irrespective of whether the state is upshift or downshift. Therefore, the output of actuator 60 is sometimes too much or too little according to a difference in sheave slide resistance.

In contrast, continuously variable transmission 100 of this embodiment controls the output of actuator 60 according to sheave slide resistance, thereby causing no excess or deficiency of the output of actuator 60, and giving moving flange 24 appropriate power.

Moving flange 24 is moved in opposite directions at upshift and at downshift (in a direction to narrow the groove width of primary sheave 20 and in a direction to extend it). Here, the output of actuator 60 denotes the absolute value irrespective of whether the moving direction of moving flange 24 is positive or negative.

Control unit 10 controls the output of actuator 60 according to differences in sheave slide resistance at upshift and at downshift, as described above. Control unit 10 may also control the output of actuator 60 according to the moving flange position between Low and Top, when the sheave slide resistance differs according to the moving flange position between Low and Top.

Figure 3:
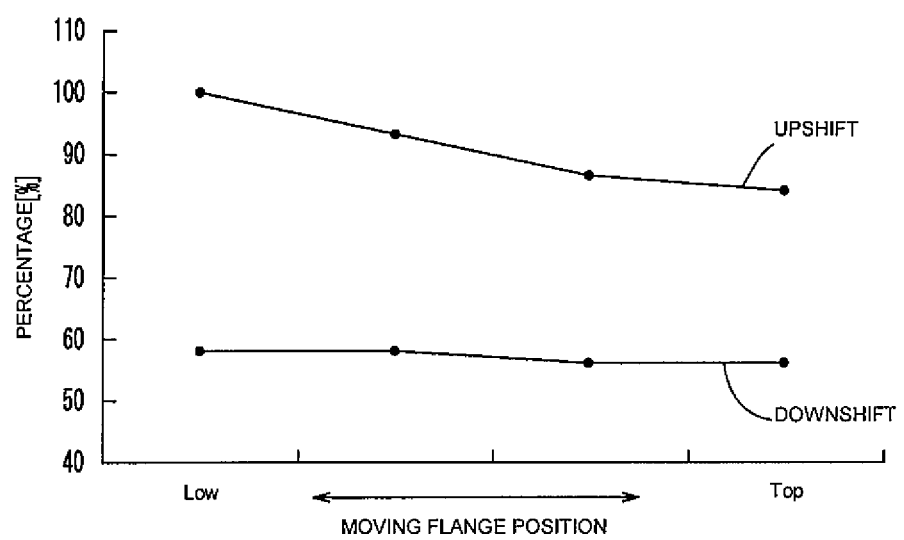
FIG. 3 is a graph showing changes in percentage when the moving flange position is varied between Low and Top according to an embodiment of the invention.

The case in which sheave slide resistance differs depending on the moving flange position between Low and Top will be specifically described. FIG. 3 shows changes in percentage (relative modulus) when the moving flange position is varied between Low and Top. The horizontal axis indicates the moving flange position and the vertical axis indicates the percentage. The percentage indicates the relative moving time of moving flange 24. Therefore, the higher the percentage, the longer the moving time of moving flange 24 is and, as such, the higher the sheave slide resistance is.

The percentage for upshift is higher in Low than in Top, that is, the sheave slide resistance is higher in Low than in Top.

In contrast, the percentage changes little between Low and Top at downshift, that is, the sheave slide resistance changes little with the moving flange position.

Control unit 10 of this embodiment controls the output of actuator 60 according to the difference in sheave slide resistance, as shown in FIG. 3, that is, according to the sheave slide resistance at the moving flange position. Specifically speaking, since the sheave slide resistance is higher in Low than in Top at upshift, the output of actuator 60 is controlled so as to be higher in Low than in Top.

Thus, the output of the actuator can also be controlled to appropriate power according to the moving flange position. This further reduces response delay and hunting due to overshooting.

In this embodiment, the percentage increases in order of Low at upshift, Top at upshift, Low at downshift, and Top at downshift, and thus the sheave slide resistance of moving flange 24 also increases in that order. Therefore, control unit 10 controls the output of actuator 60 to increase in that order.

The percentage at downshift does not change even if the moving flange position fluctuates, causing little difference in sheave slide resistance. In this case, there is no need to change the output of actuator 60 with the moving flange position, allowing the output of actuator 60 to be fixed.

Control unit 10 of this embodiment can change the output of actuator 60 on the basis of information on whether the change gear is shift to higher gear or to lower gear and on the basis of information on the moving flange position between Low and Top. Alternatively, control unit 10 may change the output of actuator 60 on the basis of only one of these types of information. For example, control unit 10 may change the output of actuator 60 on the basis of only the information on the moving flange position between Low and Top.

Figure 2:
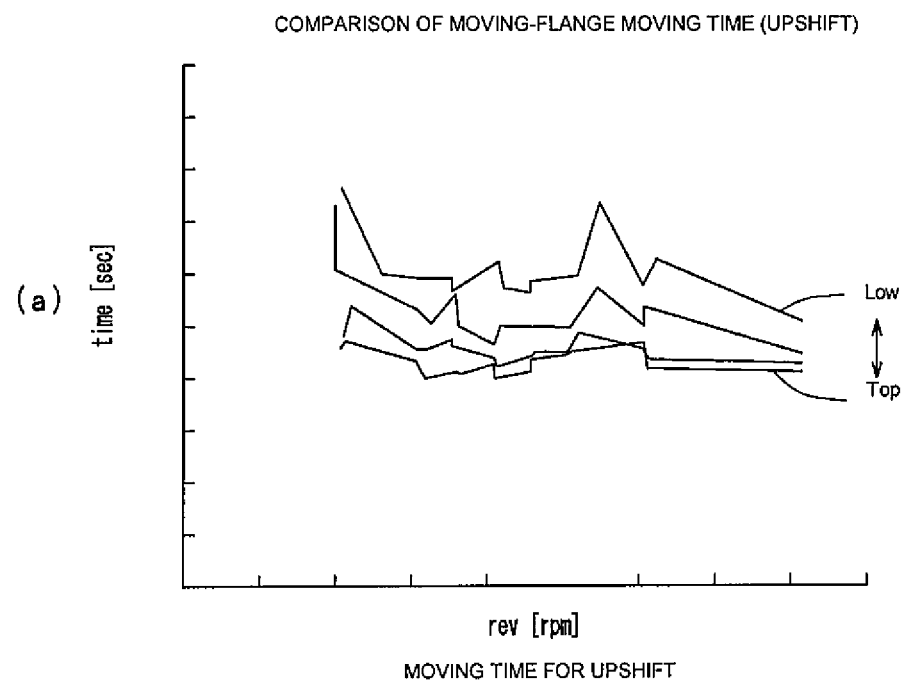
FIG. 2(a) is a graph of moving time of a moving flange during upshift.
FIG. 2(b) is a graph of moving time of the moving flange during downshift, according to an embodiment of the invention.
Figure 2:
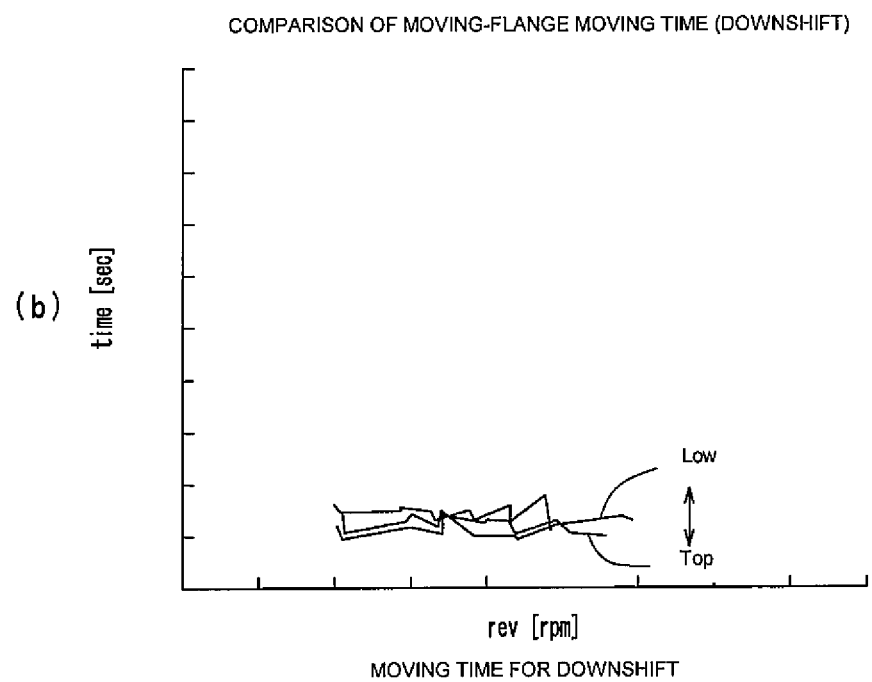

The percentages shown in FIG. 3 are calculated by the moving time of moving flange 24 shown in FIGS. 2(a) and 2(b). Specifically speaking, the percentages are calculated in such a manner that moving times at the engine speed in every moving flange position are averaged, of which the longest moving time is used as the reference (100). In the example of FIG. 2, the mean moving time in Low during upshift is the longest, and thus the percentage is determined with reference to this moving flange position.

The sheave slide resistance depends on the sliding mechanism characteristic of the continuously variable transmission. Specifically, the sheave slide resistance changes with the pushing power of the groove-width adjusting mechanism of secondary sheave 30 to belt 40 (secondary sheave thrust) and the reaction of belt 40 when moving flange 24 pushes belt 40. Accordingly, at which of upshift and downshift the output of actuator 60 is to be increased can be varied as appropriate according to the sheave slide resistance. Similarly, in addition to varying the output of actuator 60 with the moving flange position, the output of actuator 60 can also be varied as appropriate according to the sheave slide resistance.

Referring back to FIG. 1, the structure of control unit 10 of this embodiment will be described in detail. Control unit 10 connects to a sheave position sensor 27 that determines the position of moving flange 24 of primary sheave 20. Sheave position sensor 27 outputs information on the moving flange position (a moving-flange position signal) to control unit 10. Control unit 10 controls electric motor 60 according to the moving-flange position signal.

Control unit 10 also connects electrically to a rear-wheel rotation speed sensor 73 for sensing the rotation speed of a rear wheel 72. Rear-wheel rotation speed sensor 73 is disposed close to rear wheel 72, and outputs a rear-wheel rotation speed signal to control unit 10. The vehicle speed can be determined from the rear-wheel rotation speed signal.

Control unit 10 also connects electrically to an engine speed sensor 18 for sensing the rotation speed of an engine 70 and a secondary-sheave rotation speed sensor 37 for sensing the rotation speed of secondary sheave 30 which output, respectively, an engine speed signal and a secondary-sheave rotation speed signal to control unit 10. A throttle opening signal, a handle switch signal and so on can also be input to control unit 10.

Control unit 10 also connects to a storage unit 13 in which predetermined relative moduli corresponding to the moving flange positions of primary sheave 20 are stored. The predetermined relative moduli may be stored in a modulus map form produced in advance according to the moving flange positions, or alternatively, may be stored as a mathematical expression for calculating a relative modulus corresponding to the moving flange position. With the structure of this embodiment, storage unit 13 is mounted in control unit 10. Storage unit 13 may be a semiconductor memory (a RAM, a flash memory, etc.) or a hard disk.

Control unit 10 controls the actual speed change ratio of the vehicle by executing a normal transmission control, by which electric motor 60 is driven to adjust the position of moving flange 24 of primary sheave 20 so as to achieve a target speed change ratio.

Here, the normal transmission control is a control whereby a speed change ratio according to vehicle drive conditions (vehicle speed and throttle opening, etc.) is calculated from a stored map, and a gear change instruction for achieving the speed change ratio is given to continuously variable transmission 100 to finally achieve the speed change ratio. The normal transmission control is configured to achieve smooth acceleration and deceleration by decreasing the speed change ratio as the vehicle speed and throttle opening are increased (controlled to Top), and increasing the speed change ratio as the vehicle speed and throttle opening are decreased (controlled to Low).

Figure 4:
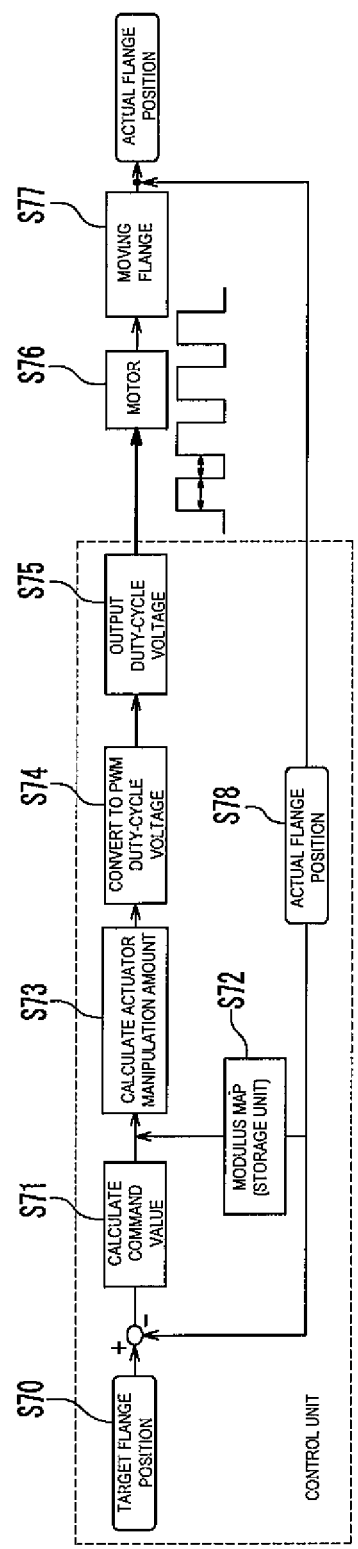
FIG. 4 is a block diagram of a method for controlling a control unit according to an embodiment of the invention.

Referring to FIG. 4, a method for controlling control unit 10 will be described. FIG. 4 is a block diagram of a method for controlling control unit 10.

Control unit 10 is for general control of engine 70 and continuously variable transmission 100 according to the above-described signals. Specifically, control unit 10 calculates the vehicle speed and acceleration from the throttle opening signal, the secondary-sheave rotation speed signal, the rear-wheel rotation speed signal, the sheave position signal, etc. to determine a target speed change ratio. Then, control unit 10 calculates the position of moving flange 24 of primary sheave 20 (target flange position) so as to achieve the target speed change ratio (S70).

Control unit 10 then detects an actual moving flange position (an actual flange position) by sheave position sensor 27 (S78), and calculates a command value to electric motor 60 from the deviation of the actual flange position from the target flange position (S71). The "command value" to electric motor 60 is the amount of control over electric motor 60 which is determined from the deviation of the actual flange position from the target flange position. In this embodiment, the command value to electric motor 60 is set such that the direction to narrow the groove width of primary sheave 20, that is, the direction to move moving flange 24 during upshift is positive, and the direction to extend the groove width of primary sheave 20, that is, the direction to move moving flange 24 during downshift is negative.

Control unit 10 then reads a relative modulus corresponding to the actual flange position sensed by sheave position sensor 27 from the modulus map stored in the storage unit (S72), and calculates the manipulation amount of the actuator by multiplying the command value to electric motor 60 by the relative modulus (S73). The actuator manipulation amount is obtained by processing (converting) the command value to electric motor 60 in consideration of the sheave slide resistance at the actual flange position.

The actuator manipulation amount processed (converted) by multiplication of the relative modulus is then converted to power to be supplied to electric motor 60 (S74). In this embodiment, the supply power is controlled using PWM. Therefore, the actuator manipulation amount is converted to PWM duty-cycle voltage Then the converted duty-cycle voltage is output to electric motor 60 (S75).

Electric motor 60 converts the electric energy of the input PWM duty-cycle voltage to mechanical energy (S76), provides the mechanical energy to moving flange 24 to move moving flange 24 to the target flange position (S77).

While the embodiment reads the relative modulus from the information on the actual flange position sensed by sheave position sensor 27 in S72, the information for reading the relative modulus is not limited to the actual flange position; for example, the relative modulus can be read also from the information on the target flange position calculated in S70.

In this embodiment, the relative moduli on the modulus map stored in storage unit 13 are of the moving time of moving flange 24 shown in FIG. 3. The embodiment controls the output of electric motor 60 by using a value obtained by multiplying the command value determined from the deviation of the actual flange position from the target flange position by the relative modulus as the final actuator manipulation amount.

While the relative moduli of this embodiment are set in consideration of the measurements shown in FIG. 3, they may alternatively be set from simulation.

In the example of FIG. 3, the relative moduli are calculated with the longest of the mean moving time at the moving flange positions as the reference (100). However, the relative moduli may be calculated with reference to any of the moving flange positions between Low and Top, because the relative moduli indicate the relative moving time (and the sheave slide resistance). For example, the relative moduli may be calculated with reference to the moving flange position of the shortest moving time (in FIG. 3, in Top at downshift).

The relative moduli of this embodiment are stored in map form in storage unit 13. Specifically, storage unit 13 stores two modulus maps, an upshift modulus map and a downshift modulus map. The maps describe relative moduli corresponding to moving flange positions shown in FIG. 3, for example. The entries of relative moduli in map form allows control unit 10 not only to read a relative modulus corresponding to the actual flange position from the modulus maps but also to achieve fast processing.

Although storage unit 13 of this embodiment stores relative moduli in map form, it may store them in different form; for example, in a mathematical expression. For the mathematical expression, a relative modulus for an actual flange position can be calculated by substituting the information on the actual flange position into the mathematical expression. The mathematical expression for calculating the relative modulus can be obtained from the graph of changes in relative modulus when the moving flange position is changed, shown in FIG. 3. For example, the mathematical expression for upshift can be expressed by the simple equation ($y=ax+b$, where a is the slope of the graph).

Figure 5:
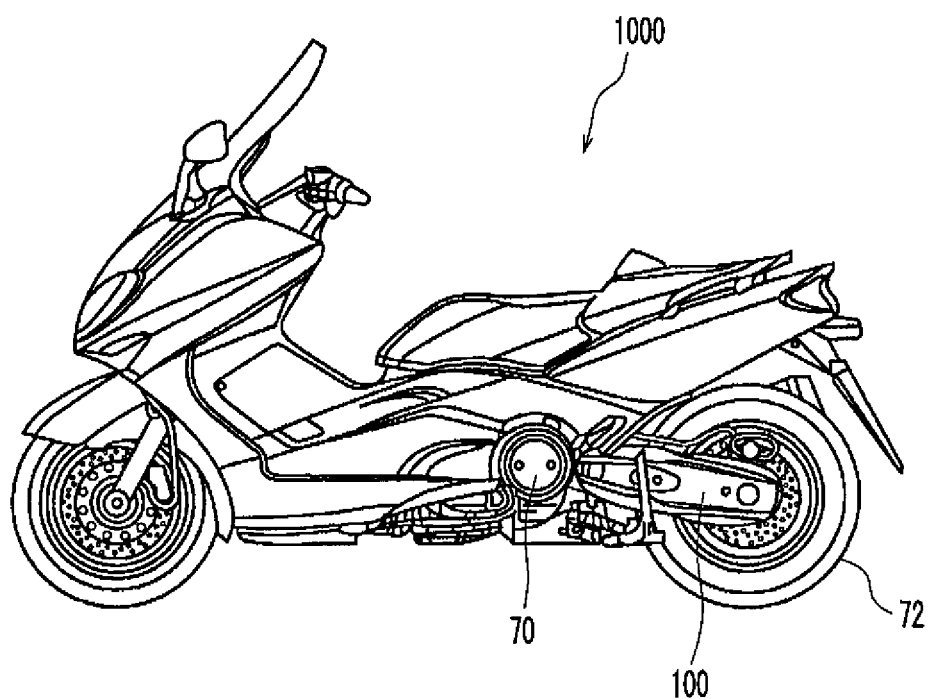
FIG. 5 is a side view of a vehicle equipped with the continuously variable transmission according to an embodiment of the invention.

FIG. 5 shows an example of a vehicle equipped with continuously variable transmission 100 of this embodiment. The vehicle, denoted at 1000, includes driving source 70, continuously variable transmission 100 connected to driving source 70, and control unit 10 for electronically controlling continuously variable transmission 100. In this example, vehicle 1000 is a straddle-type vehicle, or a motor scooter. Driving source 70 of this embodiment is an engine. The output of engine 70 is controlled according to an accelerator operation member operated by the rider. When the vehicle is of a scooter type, the accelerator operation member is a throttle grip mounted on the handle.

Primary sheave 20 in continuously variable transmission 100 is connected to engine 70, and secondary sheave 30 is connected to rear wheel 72 via a final reduction mechanism 74. The driving force of engine 70 output according to throttling is converted to the rotational power of belt 40 by primary sheave 20, which is transferred to rear wheel 72 via secondary sheave 30 to drive rear wheel 72.

While the embodiment has been described using a straddle-type vehicle as an example, it should be understood that any vehicle equipped with continuously variable transmission 100 can reduce response delay and overshooting. Thus, vehicles that can incorporate continuously variable transmission 100 are not limited to straddle-type vehicles. For example, continuously variable transmission 100 may be mounted on side-by-side vehicles (SSVs) having a tandem seat.

Figure 6:
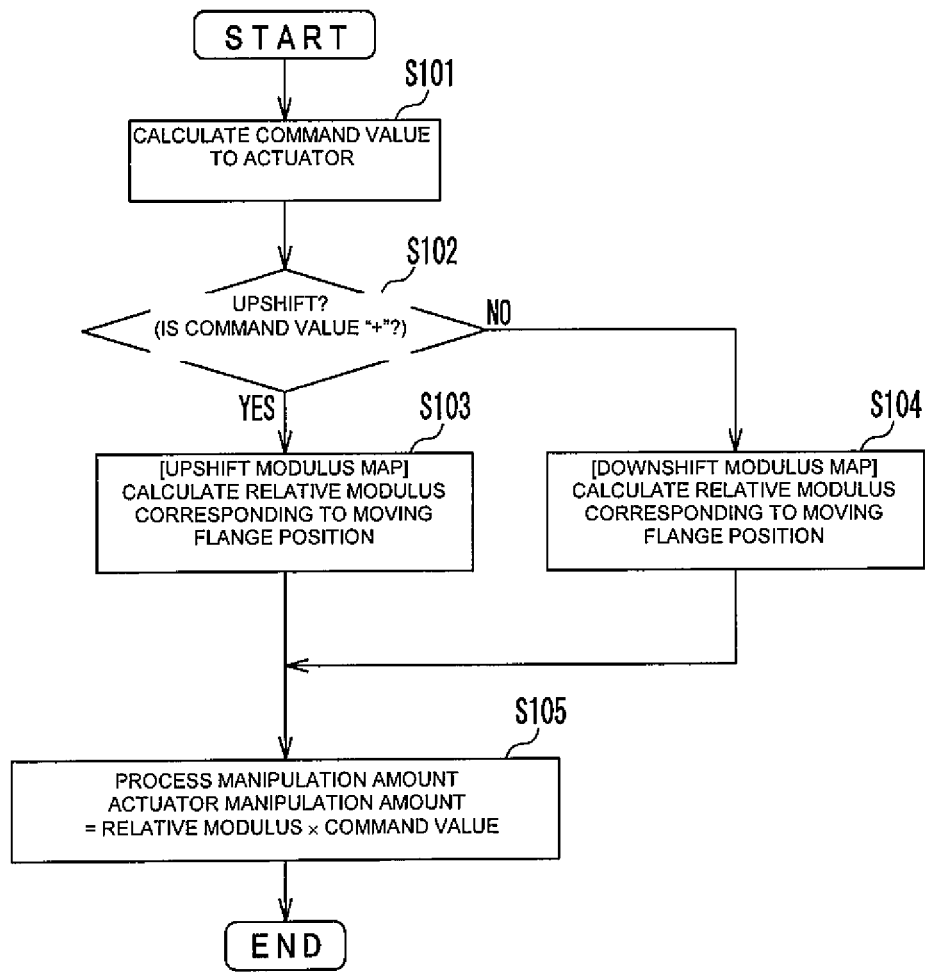
FIG. 6 is a flowchart for control of the control unit according to an embodiment of the invention.

Referring to the flowchart of FIG. 6, the control flow of control unit 10 will be described. In step S101, control unit 10 finds a target speed change ratio from the present vehicle speed, engine speed, or accelerator opening, calculates the position of moving flange 24 of primary sheave 20 for achieving the target speed change ratio (target flange position) to calculate a command value to electric motor 60. The target speed change ratio may either be fixed which is changed by a specific value from the present speed change ratio or be changed gradually with the present vehicle speed, engine speed, or accelerator opening.

Next, control unit 10 determines whether the gear change to the target speed change ratio is upshift or not (step S102). The determination of whether the gear change is upshift is made depending on whether the command value to electric motor 60 is positive or negative. When the gear change is upshift (the command value is positive), control unit 10 reads a relative modulus corresponding to the actual flange position sensed by sheave position sensor 27 from the information on the actual flange position and the upshift modulus map stored in the storage unit (S103). When the relative moduli are stored in the storage unit in the form of mathematical expression, control unit 10 calculates a relative modulus corresponding to the actual flange position.

In contrast, when the gear change is downshift (the command value is negative), control unit 10 reads a relative modulus corresponding to the actual flange position from the information on the actual flange position and the downshift modulus map stored in the storage unit (S104). When the relative moduli are stored in the form of mathematical expression, control unit 10 calculates a relative modulus corresponding to the actual flange position.

Finally, control unit 10 multiplies the command value to electric motor 60 calculated in step S101 by the relative modulus corresponding to the actual flange position to calculate the manipulation amount of the actuator (step S105).

Figure 7:
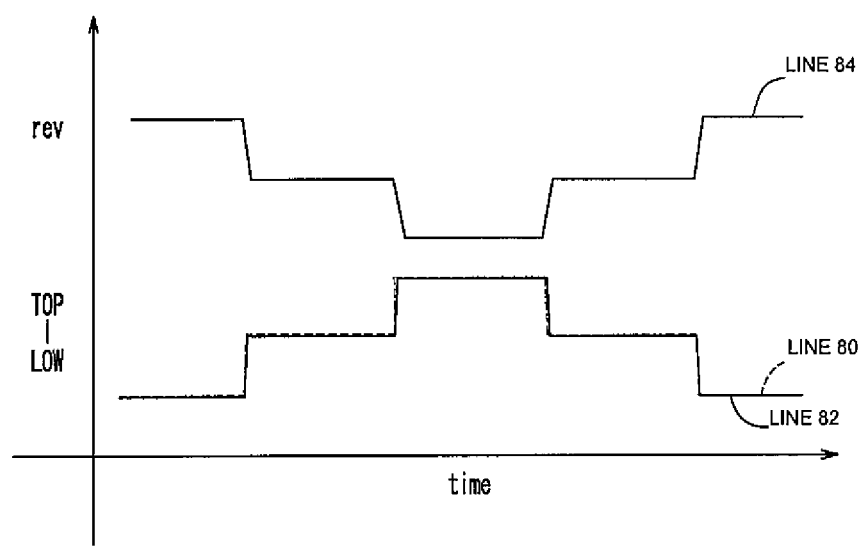
FIG. 7 is a schematic diagram of variations of the moving flange position when the continuously variable transmission according to an embodiment of the invention is used.

FIG. 7 is a schematic diagram of variations of the moving flange position and so on when continuously variable transmission 100 of this embodiment is used. Line 80 indicates a set target flange position, line 82 indicates an actual flange position, and line 84 indicates engine speed. The horizontal axis indicates time. This diagram shows that the closer line 80 and line 82, the more smoothly the moving flange reaches the target flange position.

Figure 8:
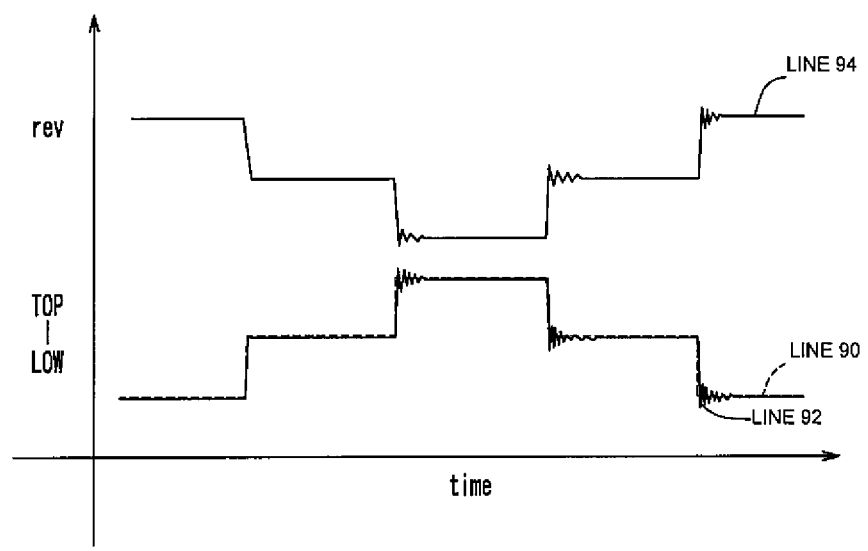
FIG. 8 is a schematic diagram of variations of the moving flange position when the output of an electric motor is controlled to Low start.

With continuously variable transmission 100 of this embodiment, line 80 and line 82 agree remarkably to each other; particularly in Top during upshift and during downshift, the up-down disorder of the lines shown in FIG. 8 is eliminated. More specifically, when the output of the electric motor is controlled to Low start, the actual flange position of line 92 of FIG. 8 fluctuates during downshift without stability. In contrast, the actual flange position of line 82 shown in FIG. 7 is stable both during upshift and downshift. Thus, continuously variable transmission 100 can avoid overshooting, as indicated by the difference between the traces of the two lines 82 and 92. The engine speed indicated by line 94 of FIG. 8 also falls disorder to repeat fluctuation, or generates so-called hunting. In contrast, in the embodiment shown in FIG. 7, the engine speed indicated by line 84 changes with stability. Thus, continuously variable transmission 100 avoids engine hunting, as indicated by the difference between the traces of the two lines 84 and 94.

While embodiments of the invention have been described, such descriptions are not restrictive and various modifications can be made.

The present invention provides a continuously variable transmission in which response delay and hunting due to overshooting are reduced.

The particular embodiments of the invention described in this document should be considered illustrative, rather than restrictive. Modification to the described embodiments may be made without departing from the spirit of the invention as defined by the following claims.

The invention claimed is:

1. A belt type continuously variable transmission, comprising:
    an actuator;
    a primary sheave and a secondary sheave each having a V-groove and a belt wound around the V-grooves of the sheaves, wherein groove widths of the sheaves are varied to control a speed change ratio steplessly, wherein
    the primary sheave and the secondary sheave each have a fixed flange and a moving flange mounted on a rotation shaft,
    the groove width of the primary sheave is adjusted by controlling movement of the moving flange of the primary sheave by the actuator, and the moving flange of the secondary sheave is biased in a direction to narrow the groove width; and a control unit connected to the actuator, wherein the control unit determines whether a gear change is upshift or downshift, and controls an output of the actuator in such a manner so as to change the output of the actuator according to a sheave slide resistance at upshift when the gear change is upshift, and controls the output of the actuator in such a manner so as to change the output of the actuator according to a sheave slide resistance at downshift when the gear change is downshift.

2. The continuously variable transmission according to claim 1, wherein the output of the actuator is larger for upshift than for downshift.

3. The continuously variable transmission according to claim 1, further comprising:

a storage unit connected to the control unit that stores specified relative moduli corresponding to moving flange positions of the primary sheave, wherein the output of the actuator is controlled according to an actuator manipulation amount calculated by multiplying a command value to the actuator by a relative modulus.

4. The continuously variable transmission according to claim 1, wherein the actuator is an electric motor; and the output of the electric motor is controlled by electric power supplied to the electric motor.

5. The continuously variable transmission according to claim 4, wherein the electric power supplied to the electric motor is controlled by a duty ratio of a pulse signal output from the control unit.

6. A straddle-type vehicle comprising the continuously variable transmission according to claim 1.

7. The belt type continuously variable transmission of claim 1, further including a storage unit, wherein the control unit reads a value from a map stored in the storage unit, the value corresponding to an actual flange position sensed by a sheave position sensor, and calculates a manipulation amount of the actuator in consideration of the sheave slide resistance at the actual flange position based at least partly on the value read from the map.

8. The continuously variable transmission according to claim 1, wherein the control unit determines a target speed change ratio and determines whether the gear change to the target speed ratio is upshift or downshift.

9. The continuously variable transmission according to claim 1, wherein the sheave slide resistance at downshift is lower than the sheave slide resistance at upshift.

10. A belt type continuously variable transmission, comprising:

an actuator;

a primary sheave and a secondary sheave each having a V-groove and a belt wound around the V-grooves of the sheaves, wherein groove widths of the sheaves are varied to control a speed change ratio steplessly, wherein the primary sheave and the secondary sheave each have a fixed flange and a moving flange mounted on a rotation shaft, the groove width of the primary sheave is adjusted by controlling movement of the moving flange of the primary sheave by the actuator, and the moving flange of the secondary sheave is biased in a direction to narrow the groove width;

a sheave-position sensor that senses a position of the moving flange of the primary sheave; and a control unit connected to the actuator and to the sheave-position sensor, wherein the control unit determines whether a gear change is upshift or downshift, and controls an output of the actuator in such a manner so as to change the output of the actuator according to a sheave slide resistance at upshift corresponding to the moving flange position sensed by the sheave-position sensor when the gear change is upshift, and controls the output of the actuator in such a manner so as to change the output of the actuator according to a sheave slide resistance at downshift corresponding to the moving flange position sensed by the sheave-position sensor when the gear change is downshift.

11. The continuously variable transmission according to claim 10, wherein the output of the actuator is larger in Low than in Top.

12. The continuously variable transmission according to claim 10, further comprising:

a storage unit connected to the control unit that stores specified relative moduli corresponding to moving flange positions of the primary sheave; and the output of the actuator is controlled according to an actuator manipulation amount calculated by multiplying a command value to the actuator by a relative modulus.

13. The continuously variable transmission according to claim 10, wherein the actuator is an electric motor; and the output of the electric motor is controlled by electric power supplied to the electric motor.

14. The continuously variable transmission according to claim 13, wherein the electric power supplied to the electric motor is controlled by a duty ratio of a pulse signal output from the control unit.

15. A straddle-type vehicle comprising the continuously variable transmission according to claim 10.

16. The belt type continuously variable transmission of claim 10, further including a storage unit, wherein the control unit reads a value from a map stored in the storage unit, the value corresponding to the moving flange position, and calculates a manipulation amount of the actuator in consideration of the sheave slide resistance at the moving flange position based at least partly on the value read from the map.

17. The continuously variable transmission according to claim 10, wherein the control unit determines a target speed change ratio and determines whether the gear change to the target speed ratio is upshift or downshift.

18. The continuously variable transmission according to claim 10, wherein the sheave slide resistance at downshift is lower than the sheave slide resistance at upshift.

* * * * *